United States Patent
Fleszewski et al.

(10) Patent No.: US 12,240,375 B2
(45) Date of Patent: Mar. 4, 2025

(54) ELECTRONICALLY CONTROLLED SIREN

(71) Applicant: Federal Signal Corporation, Oak Brook, IL (US)

(72) Inventors: Vincent S. Fleszewski, Crown Point, IN (US); Robert J. Hartke, Beecher, IL (US); Jeffery M. Loftus, Tinley Park, IL (US); Christopher Radzik, New Lenox, IL (US)

(73) Assignee: FEDERAL SIGNAL CORPORATION, Downers Grove, IL (US)

( * ) Notice: Subject to any disclaimer, the term of this patent is extended or adjusted under 35 U.S.C. 154(b) by 0 days.

(21) Appl. No.: 18/145,268

(22) Filed: Dec. 22, 2022

(65) Prior Publication Data

US 2023/0219492 A1 Jul. 13, 2023

Related U.S. Application Data (60) Provisional application No. 63/266,529, filed on Jan. 7, 2022.

(51) Int. Cl.
*B60Q 1/34* (2006.01)
*B60Q 1/26* (2006.01)

(52) U.S. Cl.
CPC ............ *B60Q 1/346* (2013.01); *B60Q 1/2611* (2013.01)

(58) Field of Classification Search
CPC .............................. B60Q 1/346; B60Q 1/2611
See application file for complete search history.

(56) References Cited

U.S. PATENT DOCUMENTS

| | | | |
|---|---|---|---|
| 1,106,446 A | 8/1914 | John, Jr. et al. | |
| 2,436,603 A | 2/1948 | Ritchey | |
| 2,766,448 A | 10/1956 | Ritchey | |
| 3,438,028 A * | 4/1969 | Stewart | H03F 3/26 340/384.73 |
| 3,991,703 A * | 11/1976 | Faust | G10K 7/04 29/889.21 |
| 4,138,673 A * | 2/1979 | Faust | G10K 7/04 340/404.2 |
| 4,393,374 A * | 7/1983 | Bandelj | G08B 3/06 340/404.2 |
| 4,529,969 A * | 7/1985 | Gosswiller | G10K 11/20 340/404.2 |
| 4,633,229 A | 12/1986 | Iacono et al. | |
| 4,649,853 A | 3/1987 | Powell | |

(Continued)

FOREIGN PATENT DOCUMENTS

WO 2021021568 A1 2/2021

OTHER PUBLICATIONS

Ghislain, Frederic, "An Experimental and Theoretical Study of High-Intensity, High-Efficiency Sirens," the Pennsylvania State University. ProQuest Dissertations Publishing 1987, 343 pages.

*Primary Examiner* — Hoi C Lau
(74) *Attorney, Agent, or Firm* — Merchant & Gould P.C.

(57) ABSTRACT

An electronically controlled motor driven siren. The siren is electronically controlled to generate different sound profiles, while having advantages of a motor driven mechanical siren. In some embodiments, the siren is part of a system of multiple sirens. The phases of the rotors of the sirens of the system can be electronically controlled to generate different multi-siren combined sound profiles.

20 Claims, 6 Drawing Sheets

(56) References Cited

U.S. PATENT DOCUMENTS

| | | | | |
|---|---|---|---|---|
| 4,847,590 | A * | 7/1989 | Gosswiller | G10K 7/04 |
| | | | | 181/188 |
| 4,980,837 | A | 12/1990 | Nunn et al. | |
| 5,012,221 | A | 4/1991 | Neuhaus et al. | |
| 5,572,201 | A * | 11/1996 | Graham | G08G 1/0965 |
| | | | | 340/904 |
| 5,586,083 | A * | 12/1996 | Chin | E21B 47/18 |
| | | | | 175/48 |
| 5,883,487 | A * | 3/1999 | Rosenzweig | H05G 1/26 |
| | | | | 318/459 |
| 7,066,106 | B2 * | 6/2006 | Giebeler | G10K 7/04 |
| | | | | 116/147 |
| 8,504,646 | B2 * | 8/2013 | Jeung | H02P 31/00 |
| | | | | 717/168 |
| 8,930,083 | B2 * | 1/2015 | Gillman | H05K 5/064 |
| | | | | 701/41 |
| 9,142,204 | B2 * | 9/2015 | Menor | G10K 7/06 |
| 9,190,940 | B2 * | 11/2015 | Markham | H02P 6/181 |
| 10,797,669 | B2 | 10/2020 | Cassidy et al. | |
| 10,810,866 | B2 | 10/2020 | Barth et al. | |
| 2002/0089416 | A1 * | 7/2002 | Dornfeld | G08B 3/10 |
| | | | | 340/384.1 |
| 2008/0231465 | A1 * | 9/2008 | Lee | G05D 1/0022 |
| | | | | 340/13.25 |
| 2012/0081222 | A1 * | 4/2012 | Tamaki | G10K 15/02 |
| | | | | 340/466 |
| 2015/0357951 | A1 * | 12/2015 | Han | H02P 9/02 |
| | | | | 74/25 |
| 2021/0023987 | A1 * | 1/2021 | Bader | G01S 13/931 |
| 2023/0001853 | A1 * | 1/2023 | Betro' | H04R 3/04 |
| 2023/0060293 | A1 * | 3/2023 | Chiera | F02D 19/024 |
| 2023/0219492 | A1 * | 7/2023 | Fleszewski | B60Q 1/346 |
| | | | | 340/468 |

* cited by examiner

ELECTRONICALLY CONTROLLED SIREN

INTRODUCTION

Sirens, such as vehicular emergency warning sirens and sirens of outdoor warning systems, are used to warn the public. For example, vehicular emergency sirens warn the public that an emergency vehicle is in emergency response mode traveling to an emergency scene. An outdoor warning system siren can warn the public of, for example, a weather or seismic event, such as a tornado, a volcanic eruption, or an earthquake.

Such emergency sirens include electromechanical designs that use a motor to spin a rotor inside of a stator, which can generate a slowly varying "wail" tone. Such emergency sirens are typically managed with a hand or foot activated switch that selectively connects and disconnects the motor from battery power.

SUMMARY

In general terms, the present disclosure is directed to a siren having a rotor, a stator, and an electronically controlled motor for spinning the rotor.

In further general terms, the present disclosure is directed to a siren having a rotor, a stator, and a brushless motor for spinning the rotor.

In certain applications, a siren of the present disclosure is an emergency siren. Non-limiting example use cases for such emergency sirens include vehicular emergency warning sirens and outdoor warning system sirens.

In one aspect, the motor is electronically controlled to control a spin speed (or, simply, speed) of the rotor relative to the stator.

In another aspect, the motor is electronically controlled to control a phase of the rotor relative to the stator.

In another aspect, the motor is electronically controlled to control speeds and/or relative phases of multiple rotors of a siren. In some examples, the speeds and/or phases of the rotors can be controlled independently of one another and/or in coordinated fashion.

In another aspect, the present disclosure is directed to a system including multiple sirens having rotors, stators, and motors, the motors being electronically controlled in coordinated fashion.

In another aspect, an electronically controlled electric motor is used to precisely maintain speed and phase of a siren rotor relative to a siren stator to control one or more attributes of sound produced by the siren, thereby producing effective warning tones in single siren or multiple siren applications.

According to certain specific aspects of the present disclosure, a siren includes: a motor; a stator; and a rotor configured to be driven by the motor to spin relative to the stator, a spin speed of the rotor determining an attribute of a siren sound produced by the siren; and a controller including a processor and memory, the memory encoding instructions which, when executed by the processor, cause the motor to adjust the spin speed.

According to further specific aspects of the present disclosure, a system includes: sirens, each of the sirens including: a motor; a stator; and a rotor configured to be driven by the motor to spin relative to the stator, a spin speed of the rotor determining an attribute of a siren sound produced by the siren; and a controller, including a processor and memory, the memory encoding instructions which, when executed by the processor, cause the motors to adjust phases and/or the spin speeds of the rotors independently of one other.

DETAILED DESCRIPTION

Throughout the several views, like reference numbers denote like elements.

A typical mechanical siren includes a stator, a rotor, and a means of spinning the rotor relative to the stator to draw air through ports defined by the rotor and the stator, thereby generating sound. The means of spinning the rotor of a mechanical siren is typically an electric motor. Some mechanical sirens include additional components, such as a brake to slow the rotor or a clutch to allow the rotor to coast down without being coupled to the motor or motor shaft.

Mechanical sirens can provide technical advantages over other audible alarm generation devices. For example, a configuration of a mechanical siren allows it to generate very loud sounds. In addition, the configuration of a mechanical siren allows it to generate a wailing sound characteristic of, for example, the sirens of fire trucks.

The wailing sound is a gradually fluctuating pitch corresponding to the speed of the rotor relative to the stator. When the motor is charged, the rotor increases in speed (i.e., spins up), causing the frequency to increase. When the motor is switched off or the motor shaft is disconnected from the rotor, the rotor decreases speed (i.e., spins down), causing the siren sound frequency to decrease. Thus, the motor can be alternately switched on and off to generate a wailing sound. This wailing sound is known to be highly effective at obtaining and holding the attention of those who hear it (e.g., observers). That is, the wailing sound is known to be an effective siren sound profile.

It can be difficult to control or adjust the sound profile of the siren sound that is generated by such mechanical sirens. Mechanical sirens are typically controlled with a switch that either provides power to the motor or shuts power off to the motor. Alternatively, mechanical sirens can be controlled with one switch that supplies power to the motor and shuts off power to the motor, and another switch, that operates a coupler (e.g., a clutch, a gear train, a cush drive (e.g., a coupler that dampens changes in the acceleration of the motor)) for selectively engaging and disengaging the motor shaft and the rotor. In some motors, a brake can be applied to slow the rotor more quickly than when it coasts down unimpeded. However, other than switching the motor on, switching the motor off, engaging and disengaging the motor shaft and the rotor, and applying a rotor brake, little can be done to manipulate audible attributes of the mechanical siren's sound profile.

It can be advantageous to have a mechanical siren driven by an electric motor that produces an easily controllable sound profile, while providing other benefits and advantages of a mechanical siren, such as loudness and wail-type sound profiles. For instance, different sound profiles (e.g., sound profiles with different sound attributes) can signify different situations, such as fire, tornado, flood, vehicle accident, bomb, or missile threat, etc. In addition, different sound profiles can be used to alert nearby observers to perform different actions, such as pulling over to the side of the road and stopping, continuing to drive while being cautious and ready to yield right of way to a nearby emergency vehicle, assembling in a basement or other safe place, and so forth.

In some situations, multiple sirens are involved. For example, in the case of a building on fire, a major vehicular accident, or a terrorist incident, multiple emergency vehicles can be dispatched to the scene of the incident, each with its own siren. In another example, a single emergency vehicle can include multiple sirens. In another example, sirens of different emergency vehicles dispatched to different emergencies can be sufficiently near each other (while en route to the scene of an emergency and/or after arriving at the scene of an emergency) that the vehicles' sirens acoustically interfere with one another, which can confuse observers as to appropriate actions to take.

In these multiple siren example situations, it can be advantageous to control and coordinate the sound profiles of the different sirens to provide different siren effects. For example, multiple sirens can be coordinated to generate a combined sound profile having a beating effect. In some examples, multiple sirens can be coordinated to generate a combined sound profile that can be directed such that the sound appears to be moving relative to an observer. In some examples, multiple sirens can be coordinated so that it is clear to observers where each emergency vehicle is located relative to the observer's location, the direction in which each emergency vehicle is travelling, the type of emergencies being attended to, etc. Typical mechanical sirens are not capable of the level of control needed to coordinate multiple sirens.

Figure 1:
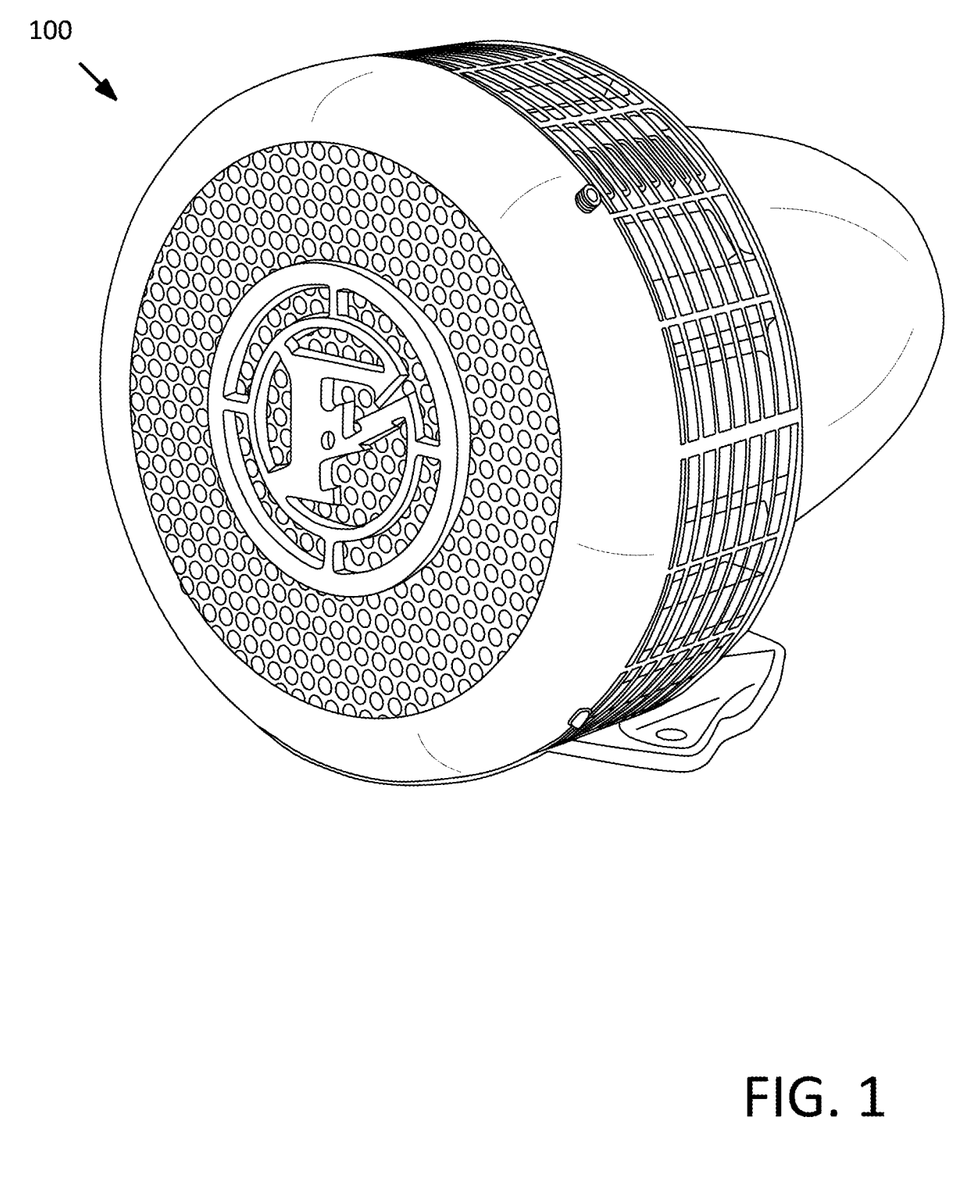
FIG. 1 depicts an example mechanical siren.

FIG. 1 depicts an example mechanical siren 100. The siren 100 includes an electric motor that drives a rotor of the siren. The siren 100 can generate a wailing siren sound profile by alternatingly switching the electric motor on and off, or by selectively engaging and disengaging a coupling mechanism between the motor shafter and the siren's rotor. The siren 100 is configured to be mounted on an emergency vehicle. In other applications, the siren 100, or operating principles of the siren 100, can be used in connection with other emergency or alert systems, such as any outdoor warning or alarm system.

Figure 2:
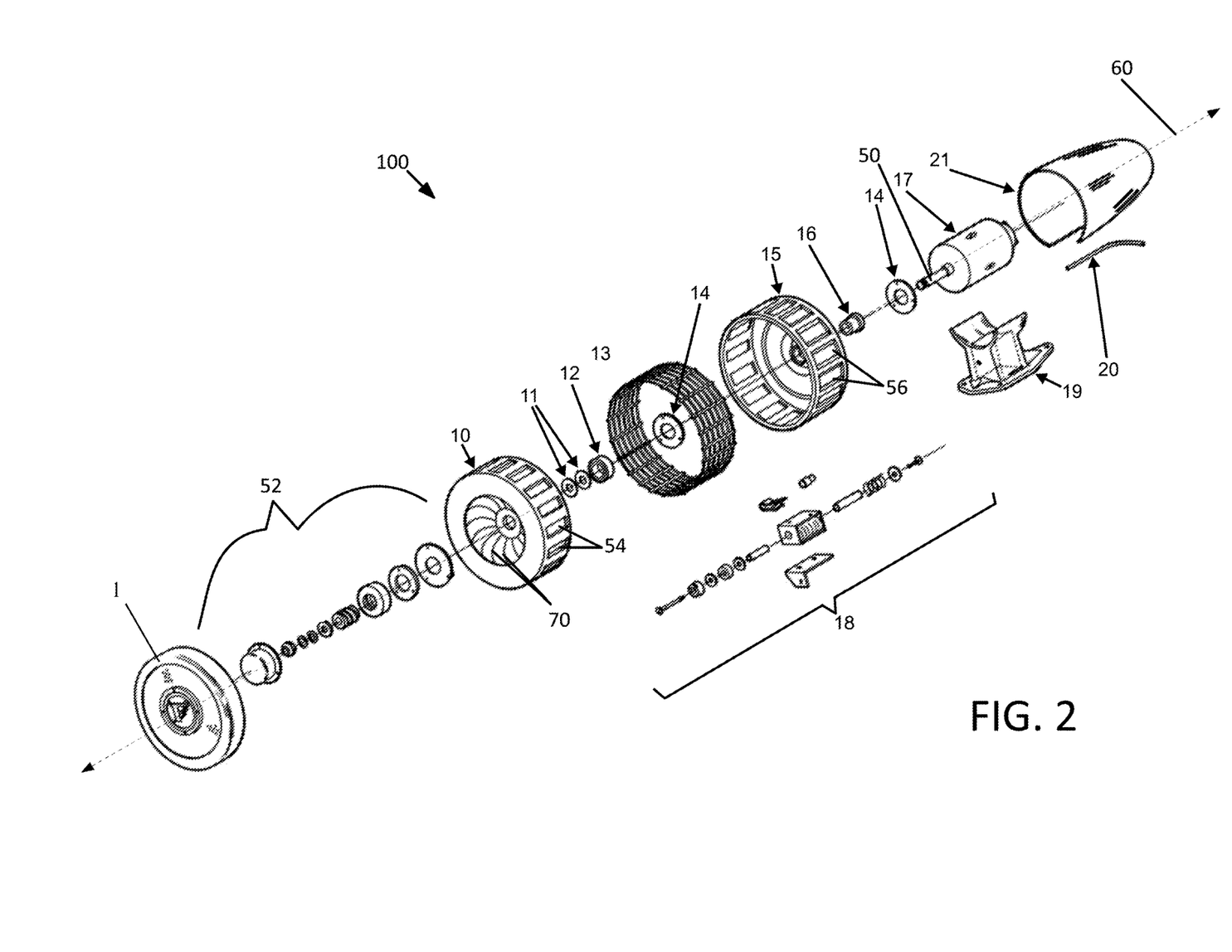
FIG. 2 is an exploded view of a portion the siren of FIG. 1.

FIG. 2 is an exploded view of a portion of the siren 100 of FIG. 1.

The siren 100 includes a grill 1 and a housing 21. The grill 1 is configured to be mounted to the housing 21 to enclose dynamic components of the siren 100.

The housing 21 houses various components of the siren 100. For example, the housing 21 houses an electric motor 17. The electric motor 17 has a drive shaft 50 that rotates when the motor is switched on. The drive shaft 50 is operably coupled to a clutch assembly 52.

In some examples, the motor 17 is a brushed motor.

In some examples, the motor 17 is a brushless motor.

In some examples, the motor 17 is a brushless direct current (DC) motor. Examples of such motors include stepper motors, servo motors, and the like. Advantageously, providing a mechanical siren with a brushless DC motor can enhance electronic controllability of the siren's rotor.

The clutch assembly 52 is configured to selective couple and decouple a siren rotor 10 and the shaft 50 of the motor 17. When the motor 17 is switched on and the clutch assembly 52 is coupling the shaft 50 to the rotor 10, the motor 17 drives the rotor 10, causing the rotor to spin. e.g., to spin up. When the motor 17 is switched on and the clutch assembly 52 is not coupling the shaft 50 to the rotor 10, the motor 17 does not drive the rotor 10, causing the rotor 10 to spin down or coast down. The rotor 10 is positioned within a stator 15. The stator 15 also includes a stator guard 13.

A bearing 12 supports the shaft 50. Additional parts provide operative coupling between components of the siren 100. These parts include washers 11, a spacer 16, and a retainer ring 14. A gasket 20 can provide environmental sealing. The siren 100 includes a stand 19 for mounting the siren 100 to another structure, such as the body of an emergency vehicle. The siren 100 also includes a brake assembly 18 configured to engage the rotor 10 for manually slowing down the rotor 10 more quickly than an unimpeded coast down of the rotor 10.

The siren 100 defines a central axis 60. The axis 60 is also the rotation axis of the shaft 50 of the motor 17, as well as of the rotor 10.

The rotor 10 includes vanes 70 and rotor ports 54 positioned circumferentially around the axis 60 at equidistant radial positions. The stator 15 defines stator ports 56 positioned circumferentially around the axis 60 at equidistant radial positions.

When the rotor 10 spins about the axis 60 within the stator 15, the spinning vanes 70 draw in air into the siren through the grill 1, and the air is forced out through the rotor ports and 54 and the stator ports 56, generating sound.

The radial position about the axis 60 of the rotor 10 relative to the stator 15 is referred to as the phase, or rotor phase. More specifically, phase refers to the relative radial positions about the axis 60 of the rotor ports 54 and the stator ports 56. When a siren has multiple spinning rotors, or when two sirens are active simultaneously, the relative phases of the rotors can impact the combined sound profile produced by the siren or sirens. For example, depending on the phases of the rotors, the sound waves produced by the rotors can constructively interfere, destructively interfere, generate a beating effect, and so forth.

Figure 3:
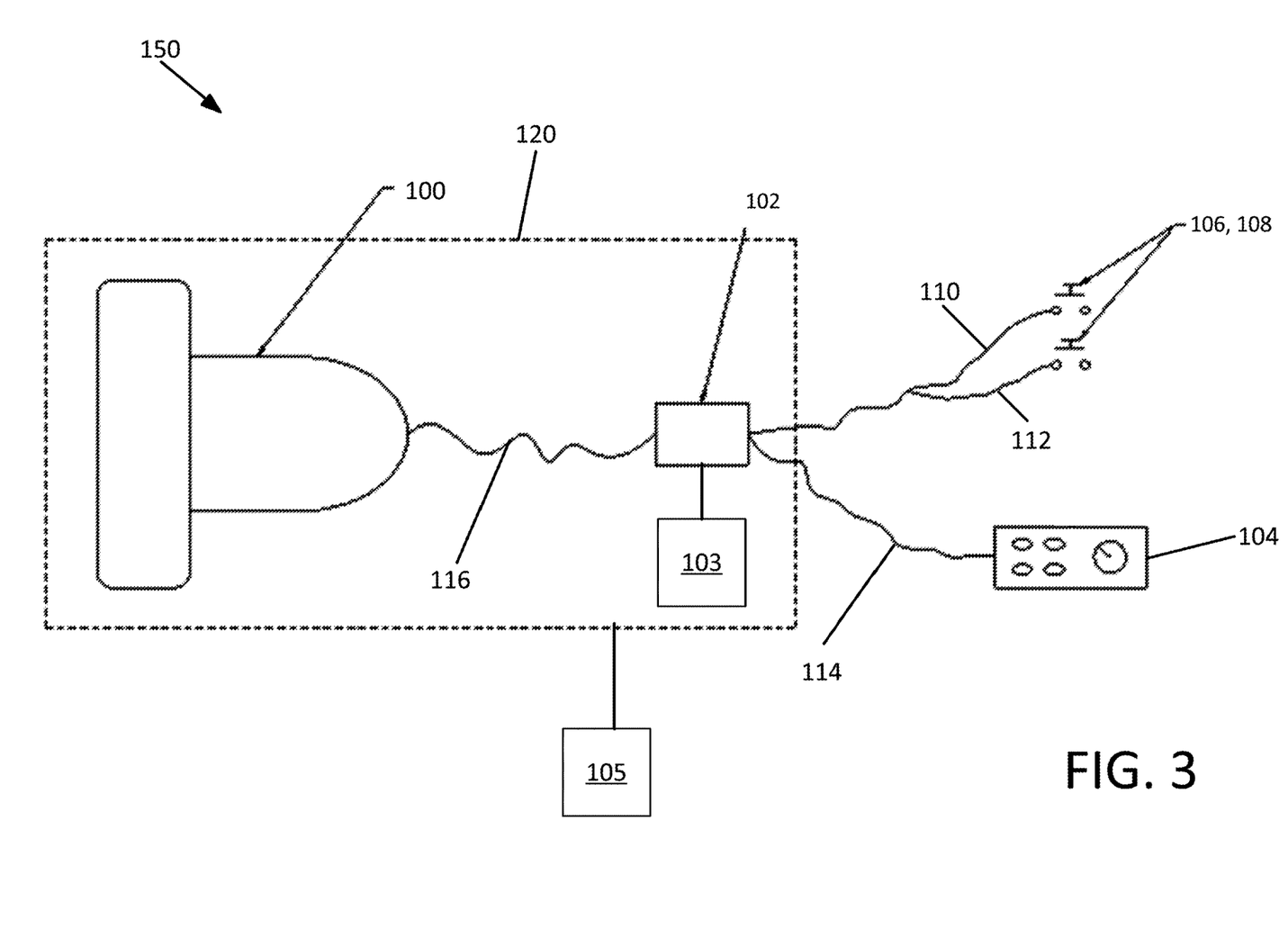
FIG. 3 is a schematic depiction of an example system including the mechanical siren of FIG. 1 and an electronic controller.

FIG. 3 is a schematic depiction of an example system 150 including a mechanical siren, such as the siren 100, and an electronic controller according to the present disclosure. It will be appreciated that the siren of the system 150 need not have all the features of the siren 100, due to electronic controllability of the siren of the system 150. For instance, the siren need not have a brake assembly and/or a clutch assembly, though in some examples these features are provided for auxiliary or redundant manual control or manual override of the siren.

The siren 100 is connected via one or more electrical conduits (e.g., wires) 116 to a controller 102, which serves as the motor driver. The controller 102 can include one or more logic devices configured to output signals for driving the motor 17 (FIG. 2). Together, the controller 102, the one or more conduits 116, and the siren 100 form a siren unit 120. In some examples, the siren unit 120 can be positioned in a single dedicated housing (such as the housing 21 (FIG. 2)) and mounted together as a unit on, e.g., an emergency vehicle or in another location, such as to a building, a tower, or a tree. In other examples, the controller 102 can be handled and mounted separately from the siren 100.

The controller 102 generates signals that control power to the motor 17 of the siren 100. In some examples, the motor receives direct current, and the motor is a brushless motor. In other examples, the motor receives direct current, and the motor is a brushed motor. In still other examples, the electrical current is alternating current. The motor 17 is connected to a power source (e.g., a battery). In some examples, the controller 102 includes the power source.

In some examples, the siren 100 can include a boost power supply 105, in addition to a regular power supply, such as a vehicle battery or other battery from which the siren 100 is configured to draw power. The boost power supply 105 is configured to allow the siren 100 to operate at any of multiple different voltages which, e.g., can vary depending on the particular use case or where the siren is mounted. In some examples, the boost power supply 105 enables the siren 100 to operate at any of, e.g., 12 Volt, 24 Volt, 48 Volt direct current, or another voltage.

The controller 102 can be configured to adjust the amount of power fed to the motor of the siren 100. Controlling power with the controller 102 can provide improved consistency in how much power is supplied to the siren, which in turn can facilitate rotor and/or stator control of the siren. For example, due to variability in manufacturing processes, materials, environmental conditions and so forth, there is a tendency for sirens to produce slightly different tones, even when all other operating characteristics of the sirens are equal. The controller 102 (optionally, using the boost power supply 105) can compensate for such discrepancies in tone across sirens by adjusting the power to the siren.

The system 150 includes one or more discrete switches 106, 108 and a control head 104. To determine the control signals provided by the controller 102 to the motor, the controller 102 is configured to receive different types of command inputs, e.g., from the switches 106, 108 and/or from the control head 104.

The control head 104 is operatively coupled to the controller 102 with a signal conduit 114. The control head 104 can include an interface (e.g., a touch screen, buttons, a microphone) for selecting sound profiles for generation by the siren 100. The sound profiles can be stored as computer readable instructions executable by one or more processors that generate signals that cause the controller 102 to run the motor of the siren in a manner that causes the siren to generate the selected sound profile.

For example, the control electronics of the controller 102 can allow for a plurality of acceleration and deacceleration profiles of the motor 17 (FIG. 2). These profiles will allow the rotor 10 (FIG. 2) to change speed in response to discrete switches (inputs) from the switches 106, 108 or by commands sent from the control head 104 as serial data.

In some examples, the control head 104 and/or the switches 106, 108 are configured to allow the operator to energize the motor, brake the motor, and generate a wail sound profile, the inputs of the switches 106, 108 and/or at the control head causing the control electronics of the controller 102 to oscillate the speed of the motor, resulting in changes to sound pressure level and audio frequencies.

In some examples, the control electronics of the controller 102 can also include a park-kill feature where a spinning motor will deaccelerate quickly when the emergency vehicle to which the siren is mounted is placed in park or the parking brake is engaged. That is, the parking brake or gear box of the emergency vehicle can be operatively coupled to the controller 102. The controller 102 can receive a signal upon the parking brake or parking gear being engaged, automatically triggering the controller 102 to cut off electric current to the siren's motor. In some examples, a reverse voltage (also referred to as a braking voltage) can be applied to the motor causing it to stop in a manner (e.g., at a rate) prescribed by software executed by the controller 102.

In some examples, the control electronics of the controller 102 are configured to allow for the mechanical siren to perform a functional test and relay status to an indicator that is part of the control head 104 (e.g., an indicator light, a speaker that generates an alert sound, or the like) or a discrete device to convey that the mechanical siren is operational to the operator.

In some examples, the control electronics of the controller 102 can allow the mechanical siren to sync with other mechanical sirens of various arrays, such as horizontal arrays, vertical linear arrays, n-level stacked polar arrays, and so forth.

In some examples, the control electronics of the controller 102 can allow for sirens on different vehicles (or different fixed installations) to sync with one another.

In some examples, the controller 102 is configured to detect the phase of the siren 100.

For example, feedback from a sensor can be provided to the controller 102. The sensor can be configured to determine absolute alignment between the rotor ports and the stator ports when the rotor is not spinning. For instance, the sensor can be configured to detect a radial position of the rotor 10 about the axis 60 (FIG. 2) when the rotor is not spinning, and thereby determine the phase of the rotor at rotor startup.

In another example, the rotor phase is determined relative to the rotor phase of another rotor of the same siren or another rotor of a different siren. For instance, the system 150 can include a microphone for detecting sound. Based on the combined sound profile of multiple siren rotors received at the microphone, the controller 102 can be configured to determine the relative phases of the rotors, and then cause a spin speed adjustment of one or more of the rotors in order to adjust the relative phase of the rotors and thereby generate a modified combined sound profile.

In some examples, syncing of multiple sirens can be accomplished using other techniques and/or based on other factors, such as relative locations of the sirens. For example, the controller 102 can receive location information associated with each of the sirens and use that information to sync the combined sound generated by the sirens. For instance, each siren can be associated with a global positioning system (GPS) device 103. Each GPS device 103 can obtain location information for the associated siren, which information can then be provided to the controller 102 to sync the combined sound emitted by the sirens based on their locations. In the example shown in FIG. 3, the GPS device 103 is integrated with the siren unit 120. In other examples, the GPS device can be more generally positioned at a vehicle or fixed structure (e.g., a building) to which the siren is attached.

Syncing of sound generated by multiple sirens based on the sirens' physical locations (e.g., using GPS devices as described above) can also be an integrated feature of a controller or controllers of non-mechanical sirens, such as electronic sirens. Similarly, syncing of sound generated by multiple sirens, such as multiple sirens installed on the same vehicle or other physical structure, using any of the syncing techniques described herein, can be an integrated feature of a controller or controllers of non-mechanical sirens, such as electronic sirens.

The controller 102 can include software that, when executed by a processor, automatically adjusts the relative phases of rotors by adjusting the speed of at least one of the rotors based on a combined sound profile generated by the rotors and picked up by the microphone of the system 150.

The controller 102 need not be limited to controlling the relative phases of two rotors or of two sirens. The controller 102 can be configured to control relative phases of several siren rotors and/or several sirens, or arrays of sirens, as descried above. In some examples, just one of the sirens or just one of the rotors is directly adjustable by the controller 102. In other examples, the controller 102 can be configured to directly and individually adjust spin of each of multiple rotors of a single siren or of multiple sirens.

For instance, when multiple mechanical sirens, or rotors, are used in one system, the phase of each siren 100 can be individually controlled by one or more controllers 102 to create a combined audio wave following the superposition principle. The resulting audio wave is the algebraic sum of the individual waves, also referred to as beating, where the resulting wave will increase and decrease in amplitude (i.e., volume or loudness) as the individual waves move through the air and their peaks and valleys overlap in reference to a fixed point. Additionally, in a multiple siren system, differing the speed or phase of the rotors will produce a resultant sound wave that can be directed. The controller 102 can be configured to direct the peak of the resulting wave to produce an audio signal that appears to be moving relative to an observer.

Figure 4:
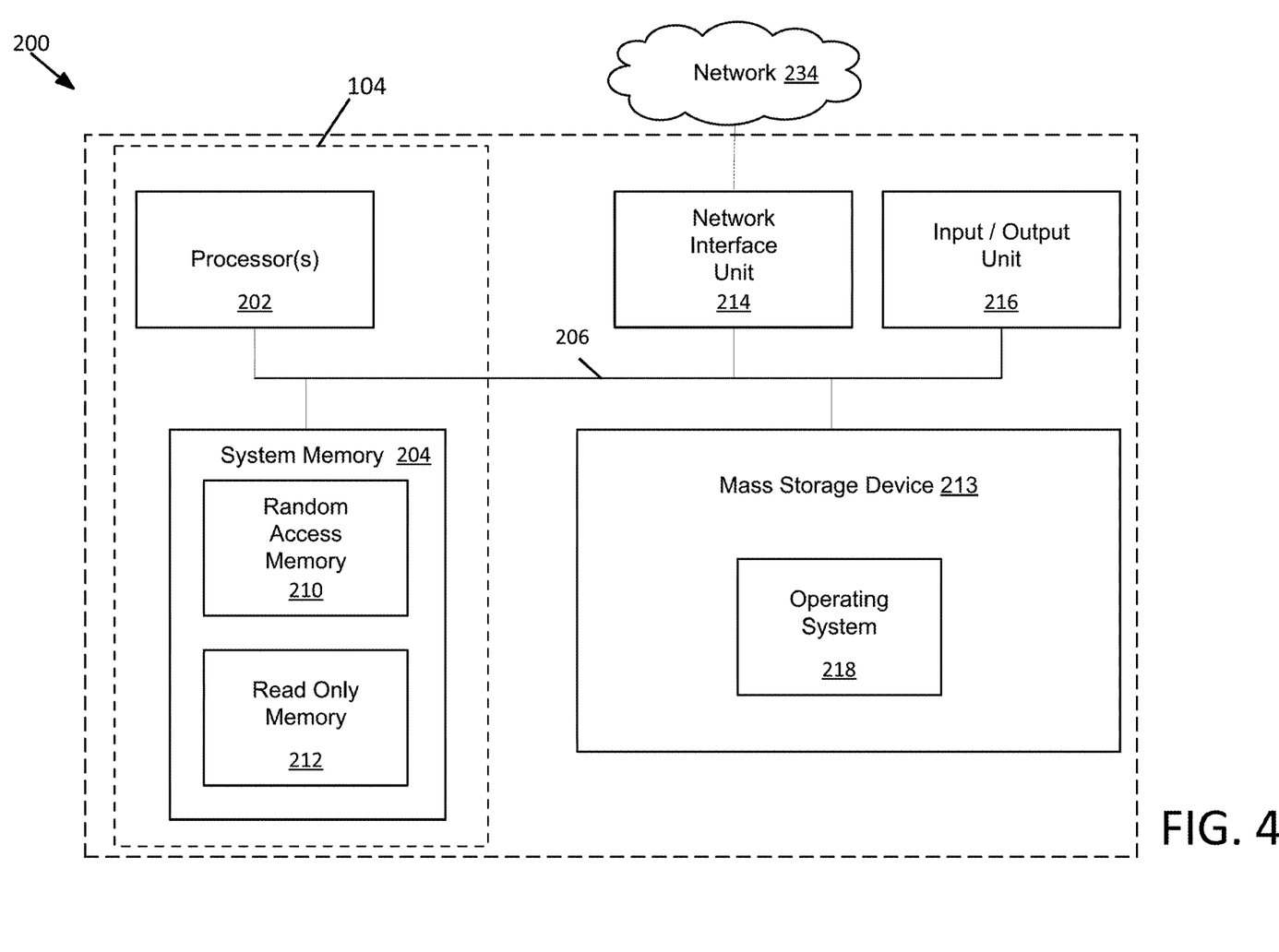
FIG. 4 is a schematic depiction of an example computing device including the electronic controller of FIG. 3 configured to control a mechanical siren.

FIG. 4 is a schematic depiction of a computing device 200 including the electronic controller 102 of FIG. 3 configured to control a mechanical siren. The computing device 200 can be integrated hardware of, e.g., an emergency vehicle or a fixed area warning system.

The controller 102 includes at least one processor 202, a system memory 204, and a system bus 206 that couples the system memory 204 to the processor(s) 202. The system memory 204 includes a random access memory ("RAM") 210 and a read-only memory ("ROM") 212. The computing device 200 can further include a mass storage device 213. The mass storage device is able to store software instructions and data. The mass storage device 213, the RAM 210, and/or the ROM 212 can store software instructions for controlling one or more siren motors as described herein. For example, one or more of the mass storage device 213, the RAM 210, and/or the ROM 212 can store instructions executable by the processor(s) 202 that encode the single rotor and/or multi rotor sound profiles described above. Similarly, the mass storage device 213, the RAM 210, and/or the ROM 212 can store the instructions executable by the processor(s) 202 that can control absolute or relative phases of one or more rotors of one or more sirens as described above.

The RAM 210, the ROM 212 and/or the mass storage device 213 can provide non-volatile, non-transitory storage for the computing device 200, and can include, for example, a hard disk or solid-state disk, and any available non-transitory, physical device or article of manufacture from which the processor(s) 202 can read data and/or instructions.

More generally, the storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 200.

The computing device 200 may operate in a networked environment using logical connections to remote network devices through the network 234. The network 234 can allow interaction between the computing device 200 and a siren. The siren can be hardwired to the computing device 200 via the network 234, or wirelessly connected to the computing device 200 via the network 234. For example, the controller 102 can control a siren positioned on the same emergency vehicle as the computing device 200, or another emergency vehicle, via the network 234. The network 234 can be any suitable data network, such as the internet, a wide area network, a local area network, a wired network, a wireless network, a cellular network, a satellite network, a near field communication network, or any operatively connected combination of these.

The computing device 200 may connect to the network 234 through a network interface unit 214 connected to the system bus 206. It should be appreciated that the network interface unit 214 may also be utilized to connect to other types of networks and remote computing systems. The computing device 200 also includes an input/output unit 216 for receiving and processing input from a number of other devices, including a touch user interface display screen, an audio input device, or another type of input device. Thus, for example, the control head 104 and/or the switches 106, 108 (FIG. 3), as well as a microphone as described above, can be components of the input/output unit 216.

Figure 5:
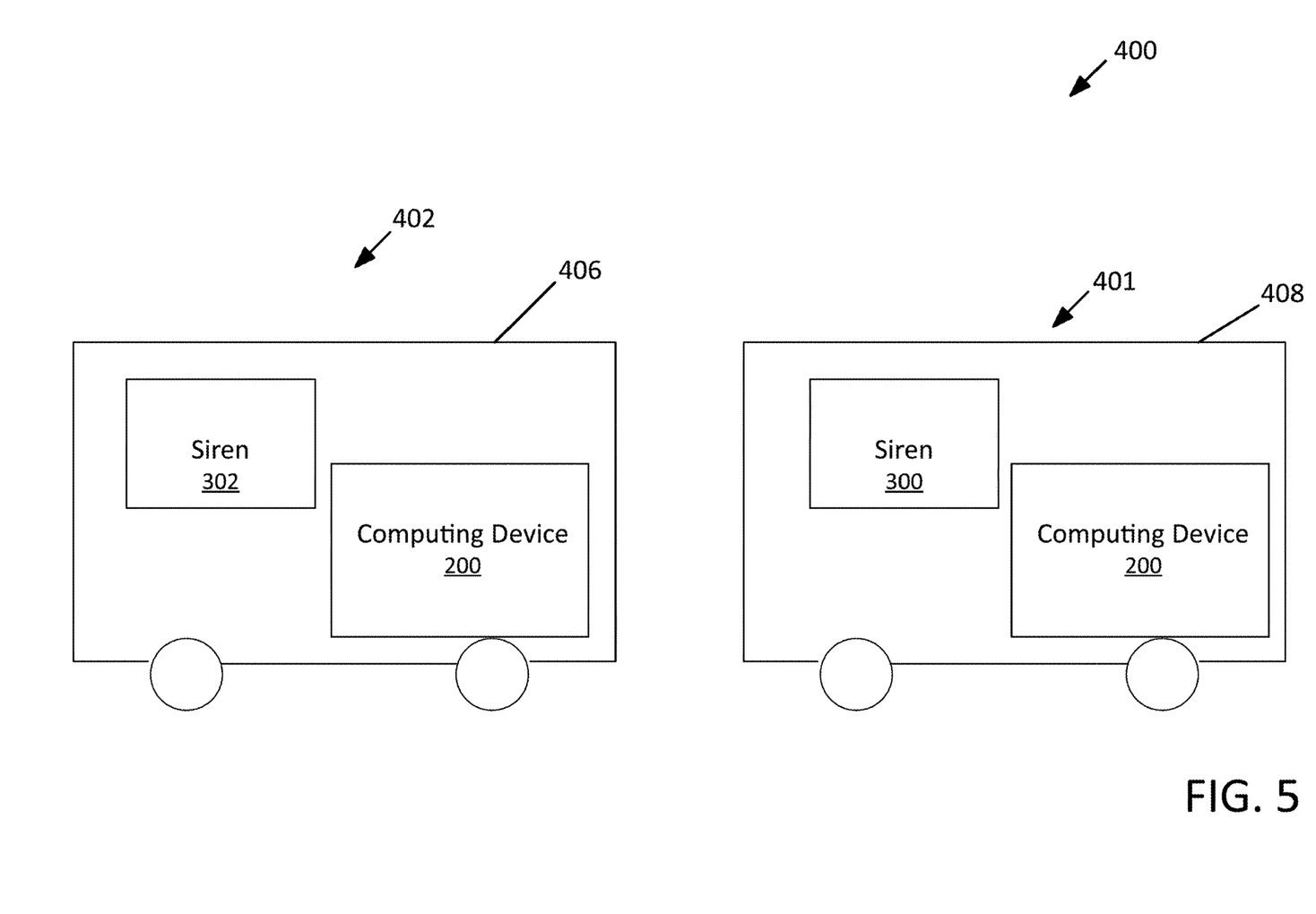
FIG. 5 is a schematic representation of a system of multiple vehicles and sirens, and including the computing device of FIG. 4.

FIG. 5 is a schematic representation of a system 400 of multiple vehicles and sirens, and including the computing device 200 of FIG. 4. It should be appreciated that principles of the system 400 described below can be applied to sirens that are mounted to bodies of fixed structures, such as a tower of an area warning system, a building, a pole, or the like. In addition, principles of the system 400 can be applied to systems in which one of the sirens being synced is mounted to a body of a fixed structure and another of the sirens being synced is mounted to a vehicle.

The system 400 includes multiple emergency vehicles, including at least a first emergency vehicle 401 and a second emergency vehicle 402. For instance, both vehicles 401 and 402 can be the same type of emergency vehicle, such as a fire truck, or different types of vehicles, such as a fire truck and an ambulance. Each vehicle 401, 402 includes a vehicle body 408, 406, respectively.

Mounted to the body 406 is a siren 302. In some examples, the siren 302 can correspond to the siren 100 (FIG. 1), or portions thereof.

Mounted to the body 408 is a siren 300. In some examples, the siren 300 can correspond to the siren 100 (FIG. 1) or portions thereof. Integrated with the vehicle 401 is the computing device 200 (FIG. 4). In some examples, the vehicle 402 also includes a computing device, such as the computing device 200.

The computing device 200 of at least the vehicle 401 is configured to control speed and relative phases of the rotors of the sirens 300 and 302 via the network 234 (FIG. 4) to provide different, selectable combined sound profiles generated by the two sirens 300 and 302. Thus, the computing device 200 can be configured to electronically control a coordinated siren, depending on the type of emergency and/or other factors, that is produced by the combination of the sirens 300 and 302. Alternatively, the computing device 200 of the vehicle 402, or the computing devices 200 of both vehicles 401 and 402 can be configured to electronically control a coordinated siren, depending on the type of emergency and/or other factors, that is produced by the combination of the sirens 300 and 302.

Figure 6:
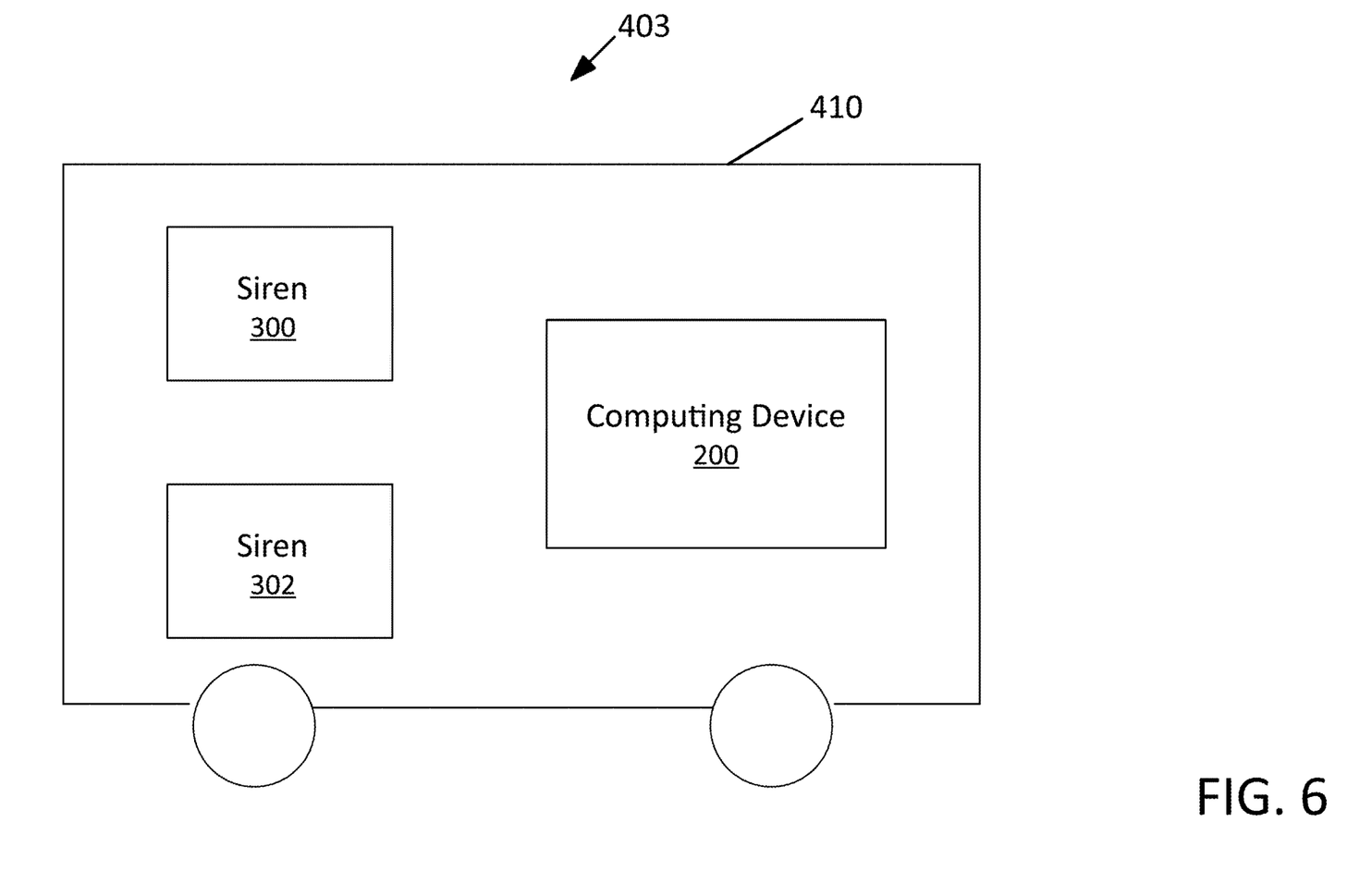
FIG. 6 is a schematic depiction of a vehicle having multiple sirens, and including the computing device of FIG. 4.

FIG. 6 is a schematic depiction of a vehicle 403 having multiple sirens, 300, 302, and including the computing device 200 of FIG. 4.

The system 400 includes a single emergency vehicle 403. The vehicle 403 includes a vehicle body 410.

Mounted to the body 410 are multiple sirens, including at least a siren 300 and a siren 302. In some examples, the siren 302 can correspond to the siren 100 (FIG. 1), or portions thereof. In some examples, the siren 300 can correspond to the siren 100 (FIG. 1), or portions thereof.

Integrated with the vehicle 403 is the computing device 200 (FIG. 4). The computing device 200 is configured to control speed and relative phases of the rotors of the sirens 300 and 302 via the network 234 (FIG. 4) to provide different, selectable combined sound profiles generated by the two sirens 300 and 302. Thus, the computing device 200 can be configured to electronically control a coordinated siren, depending on the type of emergency and/or other factors, that is produced by the combination of the sirens 300 and 302.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A siren, comprising:
   a motor;
   a stator;
   a rotor configured to be driven by the motor to spin relative to the stator, a spin speed of the rotor determining an attribute of a siren sound produced by the siren; and
   a controller including a processor and memory, the memory encoding instructions which, when executed by the processor, cause the controller to modify the attribute of the siren sound by adjusting the spin speed.

2. The siren of claim 1, wherein the memory encodes further instructions, which when executed by the processor, cause the controller to adjust a phase of the rotor relative to the stator.

3. The siren of claim 1, wherein the motor is a brushless motor.

4. The siren of claim 1, wherein the memory encodes further instructions which, when executed by the processor, cause the motor to spin the rotor such that the siren generates a predefined and selectable sound profile from a plurality of selectable sound profiles.

5. The siren of claim 1, wherein the siren is mounted to a body of an emergency vehicle.

6. The siren of claim 5, wherein the memory encodes further instructions which, when executed by the processor, cause the motor to adjust the spin speed to zero when an engine of the emergency vehicle that drives locomotion of the emergency vehicle is placed in park or when an emergency brake of the emergency vehicle is activated.

7. The siren of claim 1, wherein the siren is mounted to a body of a fixed structure.

8. The siren of claim 7, wherein the fixed structure includes a tower of an area warning system.

9. The siren of claim 1, wherein the memory encodes further instructions which, when executed by the processor, cause the controller to adjust power to the motor to adjust a tone of sound generated by the siren.

10. The siren of claim 1, further comprising a boost power supply configured to provide power to the motor at different voltages.

11. A system, comprising:
    sirens, each of the sirens including:
      a motor;
      a stator; and
      a rotor configured to be driven by the motor to spin relative to the stator, a spin speed of the rotor determining an attribute of a siren sound; and
    a controller, including a processor and memory, the memory encoding instructions which, when executed by the processor, cause each motor to adjust a phase or the spin speed of each rotor independently.

12. The system of claim 11, wherein the memory encodes further instructions which, when executed by the processor, cause each motor to spin each rotor or adjust a phase of each rotor such that the sirens generate a predefined and selectable sound profile from a plurality of selectable sound profiles.

13. The system of claim 11, wherein the sirens are mounted to a body of an emergency vehicle.

14. The system of claim 11, wherein one of the sirens is mounted to a body of an emergency vehicle and another of the sirens is mounted to a body of another emergency vehicle.

15. The system of claim 11, wherein one of the sirens is mounted to a first structural body, and another of the sirens is mounted to a second structural body that is discrete from the first structural body.

16. The system of claim 15, wherein the first structural body is a body of a fixed structure, and the second structural body is a body of a fixed structure.

17. The system of claim 15, wherein the first structural body is a body of a fixed structure, and the second structural body is a body of a vehicle.

18. The system of claim 11, wherein the controller is configured to adjust a combined sound generated by the sirens based on locations of the sirens.

19. The system of claim 18,
    further comprising a global positioning system (GPS) device associated with each of the sirens,
    wherein the controller is configured to adjust the combined sound based on location information obtained by each GPS device.

20. A coordinated emergency system, comprising:
    structural bodies;
    sirens, each of the sirens including:
      a motor;
      a stator; and
      a rotor configured to be driven by the motor to spin relative to the stator, a spin speed of the rotor determining an attribute of a siren sound, one of the sirens being mounted to one of the structural bodies, another of the sirens being mounted to another of the structural bodies; and
    a controller, including a processor and memory, the memory encoding instructions which, when executed by the processor, cause each motor to adjust a phase or the spin speed of each rotor independently to generate a combined sound profile from the sirens such that the combined sound profile appears to be moving relative to a stationary observer.

\* \* \* \* \*